(12) United States Patent
Raftelis et al.

(10) Patent No.: US 10,506,271 B2
(45) Date of Patent: *Dec. 10, 2019

(54) NETWORK ARCHITECTURE AND METHOD FOR APPLICATION DEPLOYMENT

(71) Applicant: AT&T INTELLECTUAL PROPERTY I, LP, Atlanta, GA (US)

(72) Inventors: Michael Raftelis, Austin, TX (US); Bryan P. Davis, San Antonio, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/964,686

(22) Filed: Dec. 10, 2015

(65) Prior Publication Data

US 2017/0171584 A1 Jun. 15, 2017

Related U.S. Application Data

(63) Continuation of application No. 12/366,682, filed on Feb. 6, 2009, now Pat. No. 9,237,311.

(51) Int. Cl.
*H04N 21/2668* (2011.01)
*H04N 7/173* (2011.01)
(Continued)

(52) U.S. Cl.
CPC ......... *H04N 21/2668* (2013.01); *H04L 67/02* (2013.01); *H04L 67/42* (2013.01);
(Continued)

(58) Field of Classification Search
CPC ................ H04N 21/436; H04N 21/64707; H04L 63/08; H04L 63/20; H04L 67/104;
(Continued)

(56) References Cited

U.S. PATENT DOCUMENTS 6,044,403 A * 3/2000 Gerszberg ............... H04L 29/06
709/217
6,144,944 A 11/2000 Kurtzman et al.
(Continued)

OTHER PUBLICATIONS

"Service Specification-IP Television (IPTV)", Version 3.5-A.O.O industry review draft, Jul. 2006, p. 7, 21, 24.

*Primary Examiner* — Robert J Hance
*Assistant Examiner* — Anthony Bantamoi
(74) *Attorney, Agent, or Firm* — Guntin & Gust, PLC; Ralph Trementozzi

(57) ABSTRACT

An application server that incorporates teachings of the present disclosure may include, for example, web interface for receiving a client request from a web server operating within an interactive TV network and application logic operatively coupled to the web interface for executing source code and generating HTML code according to the client request where the application logic is operatively coupled to a database that serves as a repository for executable source code, images and user information indexed according to the client request where the application logic receives the executed source code from the database and supplies the HTML code to the web server by way of the web interface and where the web server submits to a client device that generated the client request the HTML code for rendering a presentation at the client device. Other embodiments are disclosed.

20 Claims, 8 Drawing Sheets

(51) Int. Cl.
*H04N 21/462* (2011.01)
*H04N 21/4782* (2011.01)
*H04N 21/61* (2011.01)
*H04N 21/658* (2011.01)
*H04L 29/08* (2006.01)
*H04L 29/06* (2006.01)
*H04N 21/239* (2011.01)
*H04N 21/2665* (2011.01)
*H04N 21/414* (2011.01)
*H04N 21/4143* (2011.01)
*H04N 21/643* (2011.01)
*H04N 21/854* (2011.01)
*H04N 21/8543* (2011.01)

(52) U.S. Cl.
CPC ..... *H04N 7/17318* (2013.01); *H04N 21/2393* (2013.01); *H04N 21/2665* (2013.01); *H04N 21/4143* (2013.01); *H04N 21/41407* (2013.01); *H04N 21/4622* (2013.01); *H04N 21/4782* (2013.01); *H04N 21/6125* (2013.01); *H04N 21/64322* (2013.01); *H04N 21/6581* (2013.01); *H04N 21/8543* (2013.01); *H04N 21/85406* (2013.01)

(58) Field of Classification Search
CPC ..... H04L 67/1068; H04L 67/16; H04L 67/24; H04L 69/24; H04L 29/08144
See application file for complete search history.

(56) References Cited

U.S. PATENT DOCUMENTS

| | | | |
|---|---|---|---|
| 6,714,917 B1* | 3/2004 | Eldering | G06Q 30/02 348/E7.071 |
| 7,168,086 B1* | 1/2007 | Carpenter | H04L 69/08 348/E7.073 |
| 2002/0004813 A1* | 1/2002 | Agrawal | G06F 17/30902 709/201 |
| 2002/0162117 A1* | 10/2002 | Pearson | H04N 5/445 725/109 |
| 2007/0061486 A1* | 3/2007 | Trinh et al. | G06F 15/16 |
| 2007/0169144 A1* | 7/2007 | Chen | H04N 7/17318 725/30 |
| 2007/0217436 A1 | 9/2007 | Markley | |
| 2008/0010664 A1 | 1/2008 | Pelizza et al. | |
| 2008/0177998 A1 | 7/2008 | Apsangi et al. | |

* cited by examiner

400

600

700

800

900

1000

NETWORK ARCHITECTURE AND METHOD FOR APPLICATION DEPLOYMENT

CROSS REFERENCE TO RELATED APPLICATIONS

This application is a continuation of U.S. application Ser. No. 12/366,682, filed Feb. 6, 2009, which is incorporated herein by reference in its entirety.

FIELD OF THE DISCLOSURE

The present disclosure relates generally to network architectures and more specifically to a network architectures and methods for application deployment.

BACKGROUND

Network architectures abound, but it is unlikely that such network architectures are specifically suited or tailored for networks for Internet Protocol Television (IPTV) or iTV where a set-top box generally acts as the vehicle for client requests. Existing architectures that include set-top boxes might enable downloads and retrieval of files, but not necessarily applications or dynamic web content. Further note that existing systems may be dependent on the specific location of equipment or the configuration of the infrastructure equipment.

DETAILED DESCRIPTION

One embodiment of the present disclosure can entail a method at a client device operable to submit a client request to a Web server operating in an Internet Protocol TV (IPTV) network where the Web server conveys the client request to an application server in the IPTV network for processing, the application server retrieves according to the client request source code from a source code library stored in a database that defines a plurality of services supplied by the IPTV network, and the application server executes source code supplied by the database and generates Dynamic Hypertext Markup Language (HTML) code which is supplied to the Web server. The method receives from the Web server the Dynamic HTML code and renders a presentation according to the Dynamic HTML code.

Another embodiment of the present disclosure can entail computer-readable storage medium comprising computer instructions to receive a client request via a Web layer in an interactive TV (iTV) network, retrieve according to the client request source code that defines an iTV service associated with the client request, execute a first portion of the source code, generate client-specific rendering code from the executed first portion of the source code, and submit the client-specific rendering code and the second portion of the source code to the Web layer for processing at a client device that originally submitted the client request.

Yet another embodiment of the present disclosure can entail a device such as a Web server having a controller to receive from a client device a client request, submit the client request to an application server, wherein a first portion of source code is executed and client-specific rendering code is generated at the application server according to the client request, receive the client-specific rendering code and a second portion of source code from the application server, and submit to the client device the client-specific rendering code and the second portion of source code for rendering at the client device a media service associated with the client request.

Yet another embodiment of the present disclosure can entail an application server having a web interface for receiving a client request from a web server operating within an interactive TV (iTV) network and application logic operatively coupled to the web interface for executing source code and generating HTML code according to the client request where the application logic is operatively coupled to a database that serves as a repository for executable source code, images and user information indexed according to the client request where the application logic receives the executed source code from the database and supplies the HTML code to the web server by way of the web interface and where the web server submits to a client device that generated the client request the HTML code for rendering a presentation at the client device.

Figure 1:
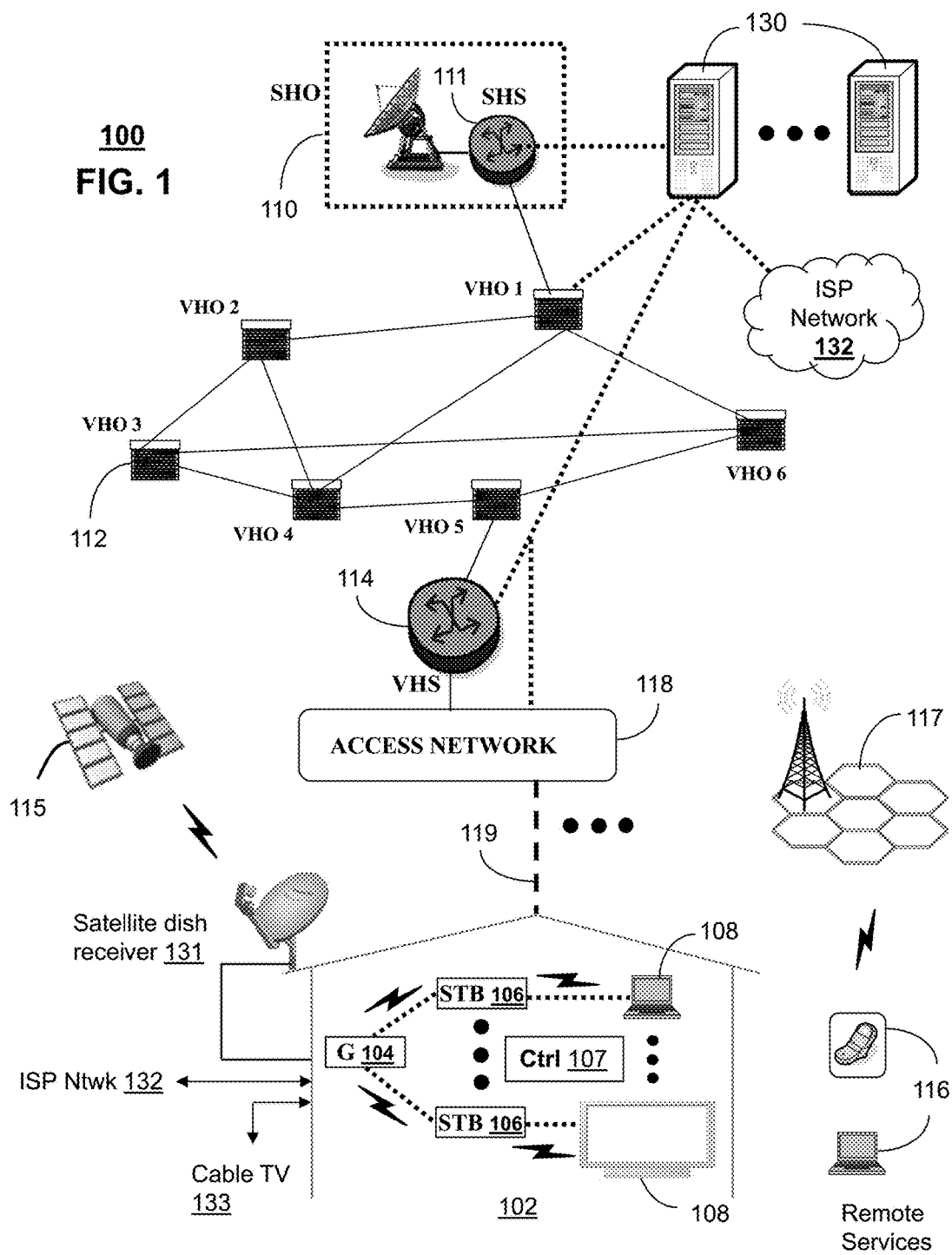
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on). Yet another portion of the computing device 130 can represent the web server 606, the application server 608, and/or the database 610 of FIG. 6 as further described below.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
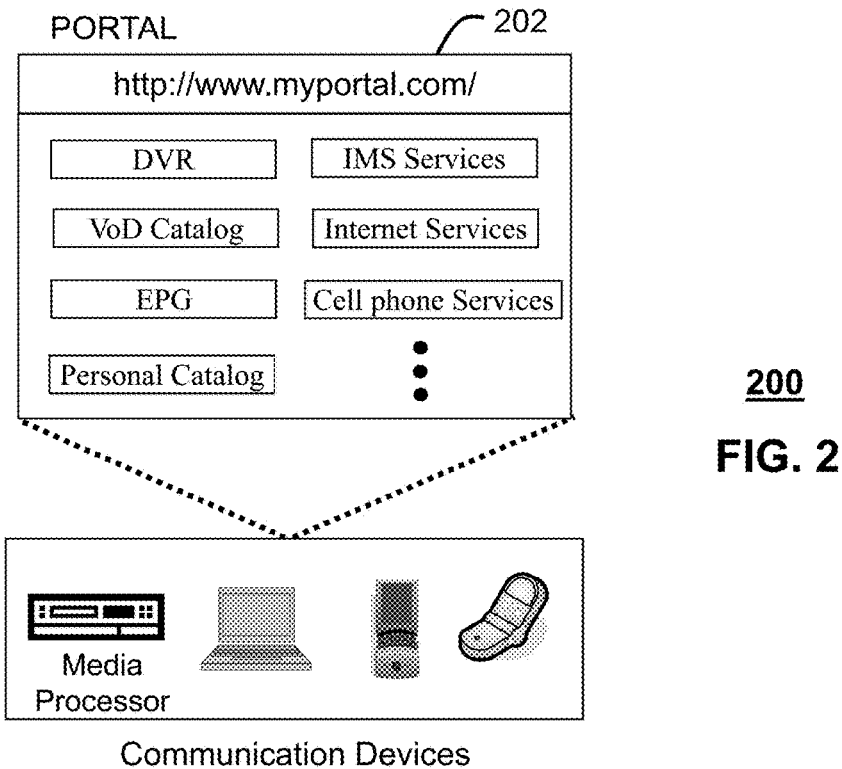
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. As noted above, the portal 202 or computing devices 130 can also can represent the web server 606, the application server 608, and/or the database 610 of FIG. 6 as further detailed below. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
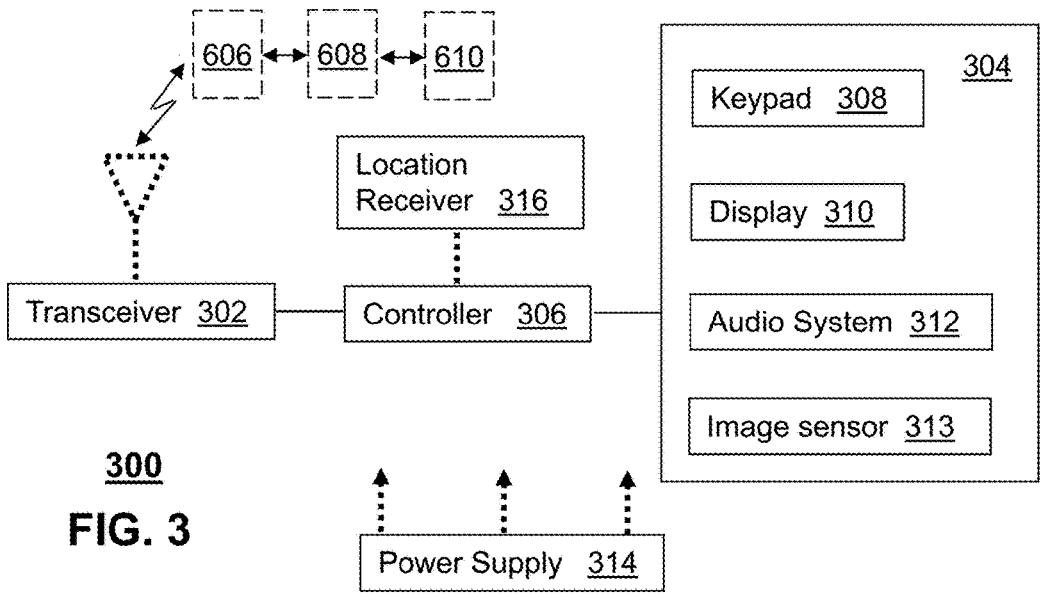
FIG. 3 depicts an illustrative embodiment of a communication device utilized in the communication system of FIG. 1.

FIG. 3 depicts an exemplary embodiment of a client device such as a communication device 300. Communication device 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof. The client device 300 can be operatively coupled to web server 606, application server 608, and a computer device containing the database 610 as further detailed below with respect to FIG. 6.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
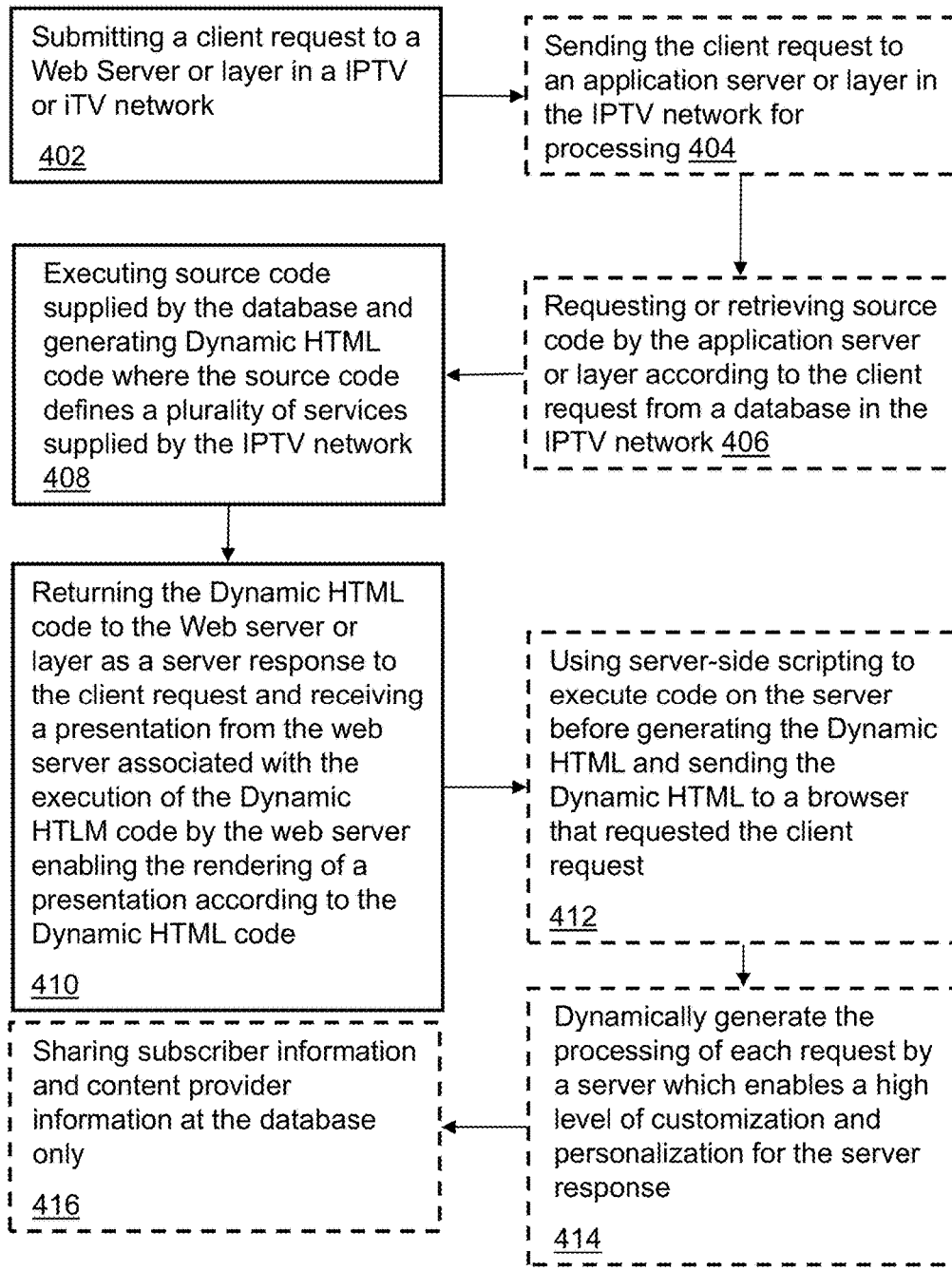
FIG. 4 depicts an illustrative embodiment of a method operating in portions of the communication system of FIG. 1.

FIG. 4 depicts an illustrative method 400 that operates in portions of the communication system of FIG. 1. Method 400 can begin with step 402 in which a client request is served via a Web layer in a IPTV or iTV network. The method can send the client request to an application layer in the IPTV network for processing at 404 and request source code by the application layer from a database in the IPTV network at 406. The method 400 can the execute source code and generate Dynamic HTML code at the application layer at 408. At 410, the method can return the Dynamic HTML code to the Web layer as a server response to the client request. At 412, the method uses server-side scripting to execute code on the server before generating the Dynamic HTML and sending the Dynamic HTML to a browser that requested the client request. Each request processed can be dynamically generated by a server which enables a high level of customization and personalization for the server response at 414. At 416, the method can share subscriber information and content provider information at the database only.

Upon reviewing the aforementioned embodiments, it would be evident to an artisan with ordinary skill in the art that said embodiments can be modified, reduced, or enhanced without departing from the scope and spirit of the claims described below.

Other suitable modifications can be applied to the present disclosure without departing from the scope of the claims below. Accordingly, the reader is directed to the claims section for a fuller understanding of the breadth and scope of the present disclosure.

Figure 5:
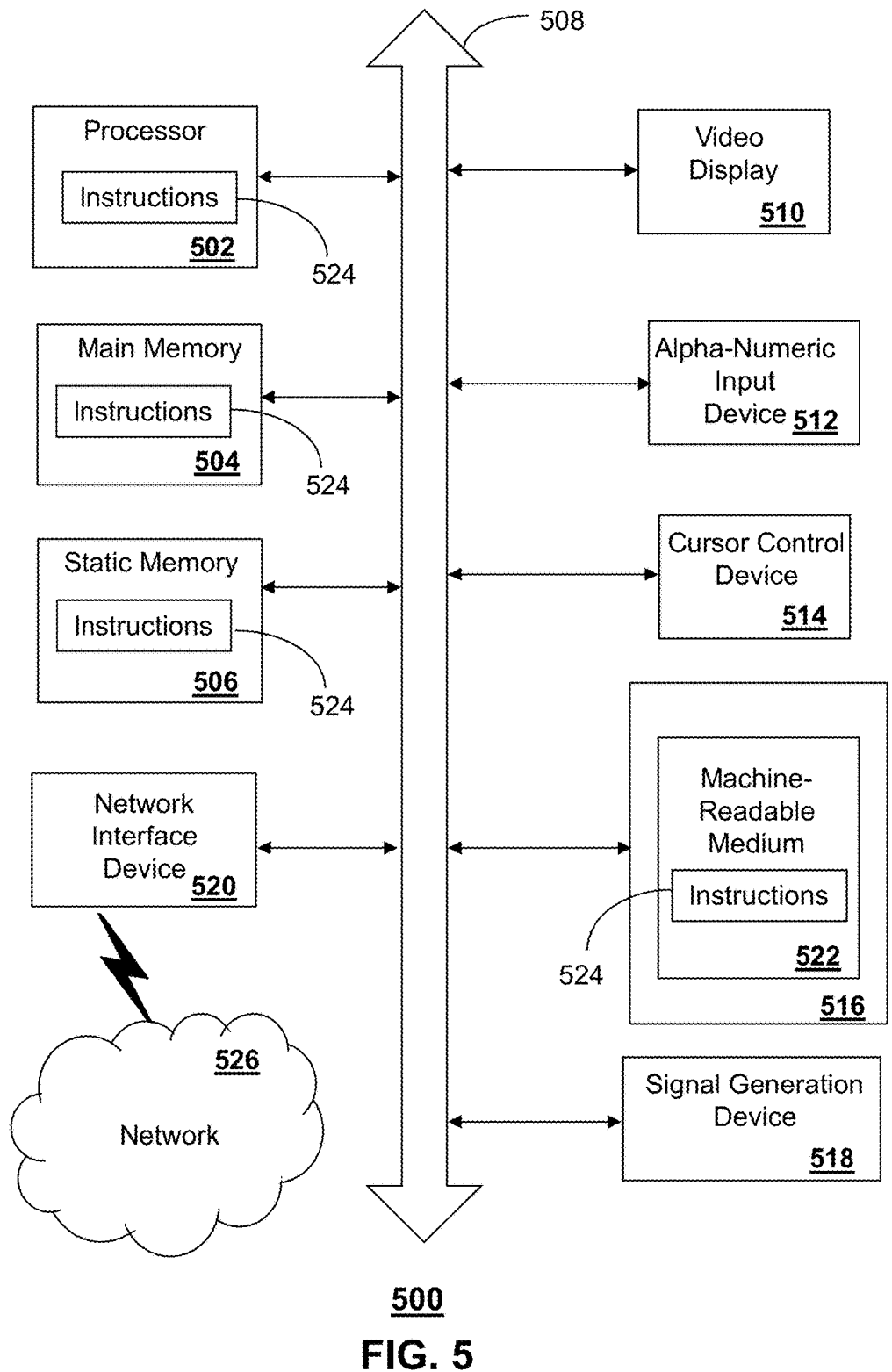
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Figure 6:
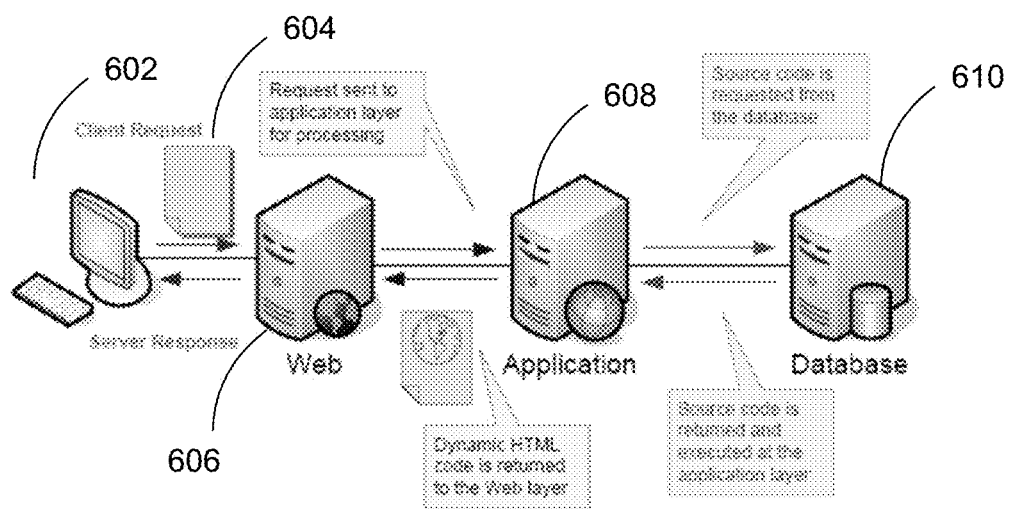
FIG. 6 is an illustrative embodiment of a simplified communication system in accordance with the embodiments herein.

Referring to FIG. 6, a system or infrastructure 600 designed to support application deployment within an IPTV network is depicted that provides the hardware, services, and logical connectivity to serve STB based applications. The system 600 can include a client 602, web logic 606, application logic 608 and a database 610. Each layer provides distinctive services and has a unique role within the design. In general, the Web layer or logic 606 serves client requests 604 and can serve as a resolution point for client application requests. The application layer or logic 608 is responsible for executing source code and generating the HTML. The Database 610 serves as the repository for the source code (executables), images, and user information.

The system 600 uses server-side scripting that executes code on the server before generating the HTML and sends it to the requesting browser. The response HTML contents does not require any visible or executable source code. ASP.Net, PHP and JSP (Java Server Pages) are some of the more common server-side frameworks that can be used. Execution of the source code by the server allows for the requesting entity such as a browser or media player to only meet minimal requirements. Each request processed by the server can be dynamically generated allowing for a high level of customization, personalization, and uniqueness. The architecture herein can have two symmetrical paths, namely a Subscriber path and a Content Provider/Administration path. These two paths are logically separated from each other with relevant data being shared only through the database.

Figure 7:
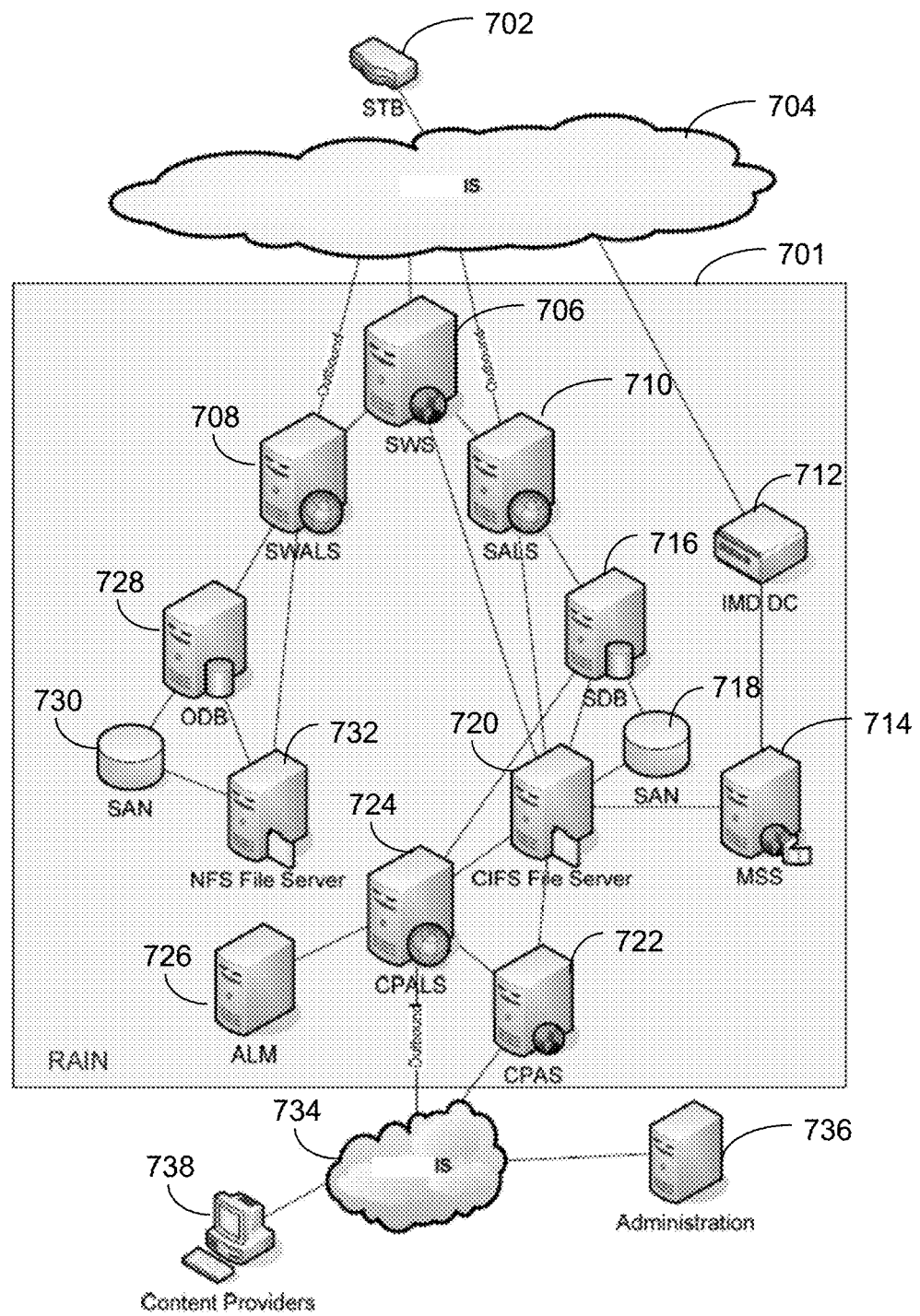
FIG. 7 is another illustrative embodiment of a communication system in accordance with the embodiments herein.

Referring to FIG. 7 depicts a Ready Application for Infrastructure Network (RAIN) 701 designed to support Application deployment within an iTV or IPTV environment 700. The network 701 can provide the hardware, services, and logical connectivity required to serve and STB 702 and STB based applications in areas providing iTV or IPTV service via a network 704. The RAIN network 701 can include a plurality of components coupled to the STB 702. The components can include a Subscriber Web Server (SWS) 706 that can include a web service responsible for brokering requests from/to the network (704 or 703 or 701) subscribers. The SWS 706 represents the only subscriber facing service. In a traditional application model it can serve as the web layer. The network 701 can also include Subscriber Application Logic Services (SALS) 710 that provides the business logic that is responsible for executing the source code and generating the HTML output. It can serve as the middleware between the SWS and a database (DB) (728 or 716). In a traditional application model it can serve as the application layer. Network 701 can further include Subscriber WebLogic Application Logic Services (SWALS) 708 that also provides the business logic that is responsible for executing the source code and generating the HTML output. It serves as the middleware between the SWS and DB. In the traditional application model it can also serve as the application layer. The network 701 can include Content Provider/Administration Services (CPAS) 722 which is similar in function to the SWS 706 except the web service is content provider facing. It can serve as the external facing web service for content providers. Secondarily, the CPAS 722 serves as the Administration interface that allows support personnel to authorize, authenticate, and approve ingested content. The Content Provider Application Logic Services (CPALS) 724 is similar in function to the SALS 710 except it is providing the business logic for the content providers 738. It interfaces with the CPAS 722 and DB 716 to provide a middleware to authenticate valid users, execute source code, etc. A Database (DB) can provide a structured collection of data that allows for personalization, indexing, and other services. The SDB version 716 runs SQL Server while an ODB version 728 runs Oracle Enterprise in this particular embodiment. The ODB 728 can be further coupled to Storage Area Network (SAN) 730 and to a file server 732. The SDB 716 can be further coupled to SAN 718 and to a file server 720. Of course, embodiments contemplated within the scope of the claims are not limited to such servers. The network 701 can also include Media Subscriber Services (MSS) 714 for delivering media objects such as video and images. This service is considered the storage or vault for media and serves as the aggregation point for content. An Internet Mediation Device (IMD) 712 can provide the distribution of content to the content distribution network for the purpose of serving video content from each VHO. As a secondary role, the IMD 712 can also provide failover from failures associated with local IMDs in each VHO. The network 701 can include an Automation, Logging, Monitoring (ALM) module 726 that performs a collector role by aggregating logging and monitoring information and delivering it upon request to various upstream analysis tools. It also provides automation functionality to perform select repeatable tasks.

Figure 8:
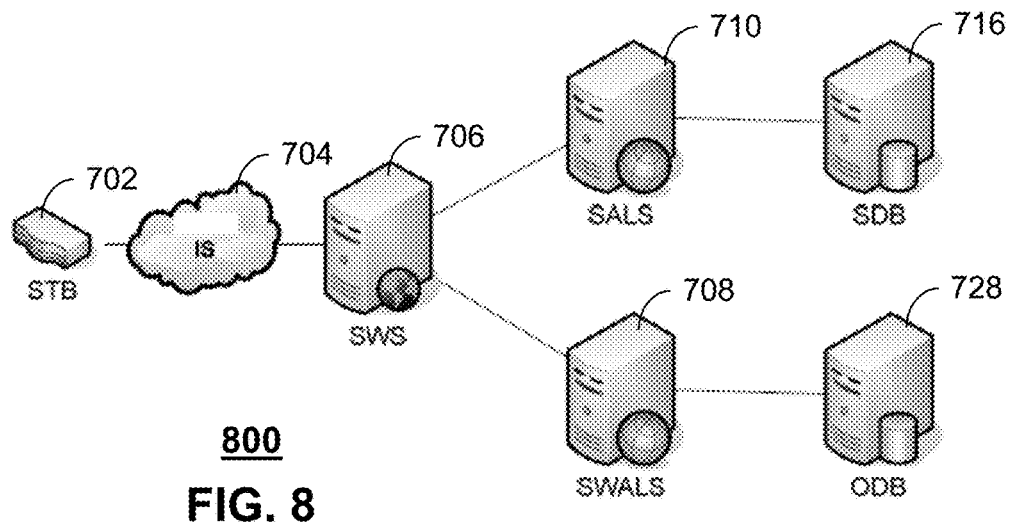
FIG. 8 depicts a subscriber portion of the communication system of FIG. 7.

Referring to FIG. 7 and more particularly to FIG. 8, a subscriber portion 800 represents the hosting point for subscriber requests for applications. The subscriber portion 800 can include STB 702, network 704, SWS 706, SALS 710, SDB 716, SWALS 708 and ODB 728. The only service exposed to the subscriber in this particular flow is the SWS 706. The SWS 706 serves as the broker for requests to the application logic. For a typical application, the launch URL resolves via DNS to one of the SWS IP addresses or the virtual IP address associated with the SWS 706.

Figure 9:
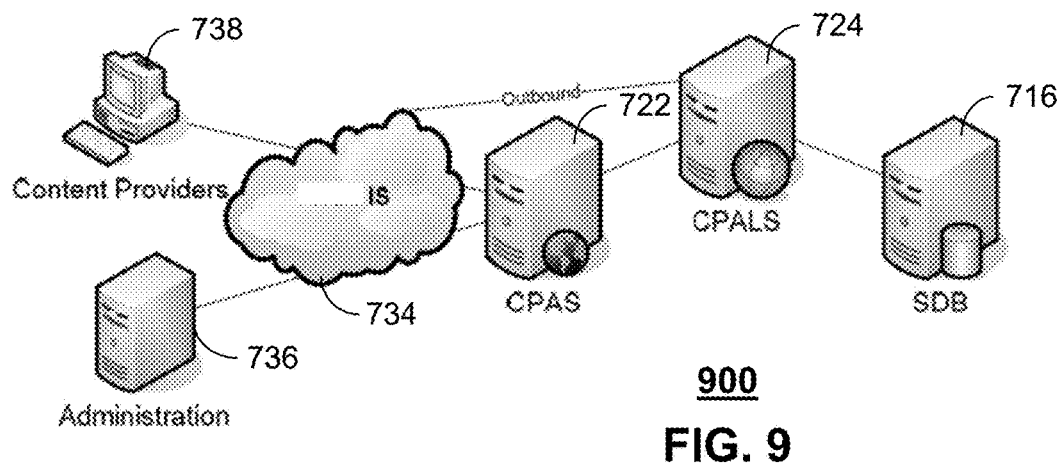
FIG. 9 depicts a content provider portion of the communication system of FIG. 7.

Referring to FIG. 7 again and more particularly to FIG. 9, a content provider portion 900 illustrates a Content Provider path that enables providers to perform several tasks such as creating dynamic Web applications, uploading Media content such as images and video, modifying existing Web applications, and monitoring and managing the access and availability of the Web applications. An additional functionality that the Content provider path serves is Administration. In the Administration role, operators can approve content, perform maintenance and general debugging of the applications. The Administration role is restricted to a minimum set of personnel based on key responsibilities. All connections on the Content Provider path can be subject to strict enforcement of protocol and access to prevent unauthorized modifications to the applications and/or media content. The content provider portion can include the content providers 738, administration 736, network 734, CPAS 722, CPALS 724, and SDB 716.

Figure 10:
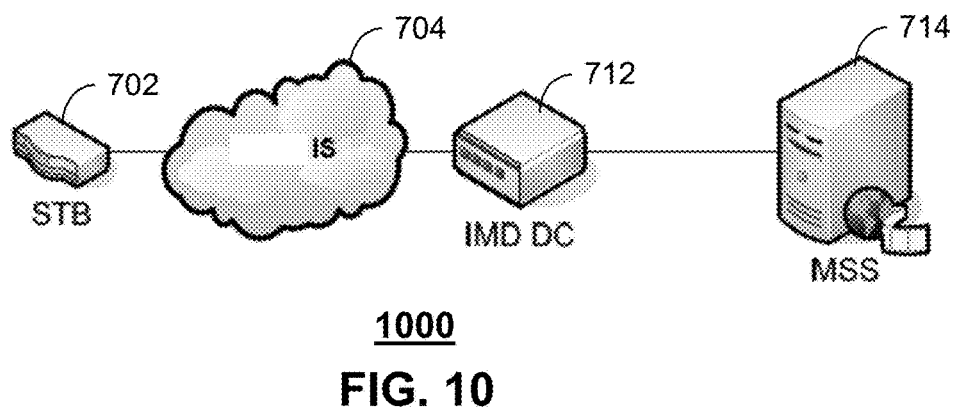
FIG. 10 depicts another content provider portion for media services of the communication system of FIG. 7.

Referring to FIG. 10, a media services portion 1000 can include STB 702, network 704, IMD DC 712, and MSS 714. The Media Services is responsible for receiving media from content providers, validating the content for stream particulars, and distributing the content. The IMD DC 712 can have a defined scheduled for each application and uses a web-crawl to query the contents of the directory. If the directory has been modified, then the IMD DC 712 retrieves the modified files and distributes them to the VHOs (See 1112 in FIG. 11).

The approach to providing content to the subscribers has the following characteristics that entail Content Acquisition, Distribution and Delivery, and Subscriber Access. Content acquisition involves receiving or retrieving content from a content provider. The MSS 714 is the point interface to the acquisition process. The Distribution and Delivery function involves the IMD DC 712 and the MSS 716. The IMD DC 716 can have a defined scheduled for each application and uses a webcrawl to query the contents of the directory on the MSS. If the directory has been modified, then the IMD DC 712 retrieves the modified files and distributes them to the VHOs. Subscriber access is not necessarily part of the RAIN architecture, but can involve delivering content to the subscriber base from the local VHO IMD.

Figure 11:
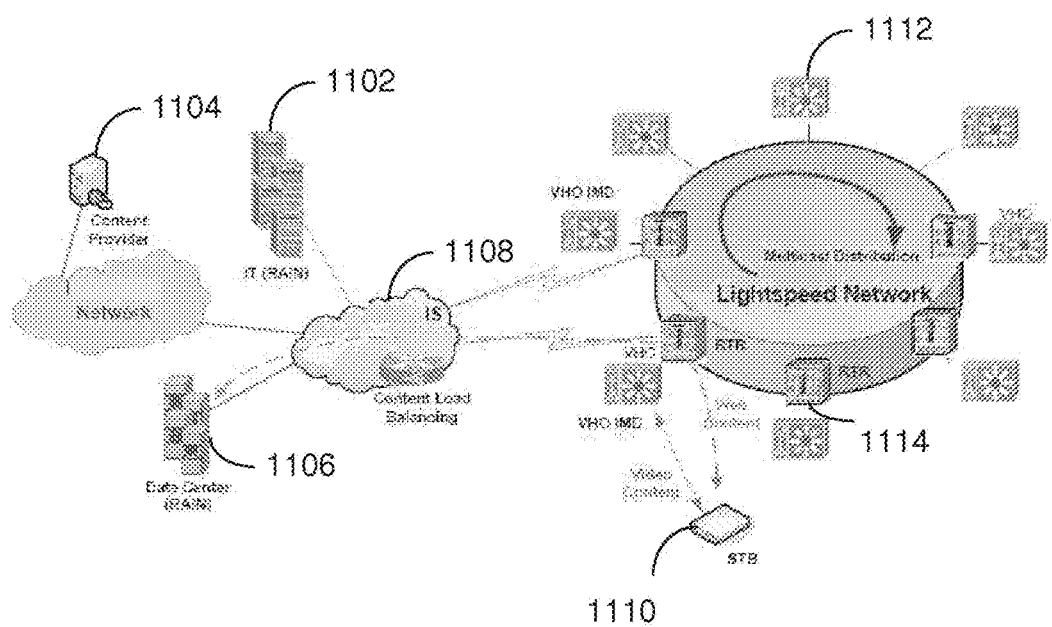
FIG. 11 depicts a media services end to end layout in accordance with the embodiments herein.

Referring to FIG. 11, an end to end network 1100 for the media services layer is shown that can include a rain architecture (1102 and 1106) coupled to a content provider 1104 via a network 1108. The network 1108 can provide requested applications to the STB 1110 via VHOs 1112 and Real-Time Transmission (RTR) functions 1114 as illustrated.

The infrastructure servers represent common functions that can be shared or utilized by each server type. The file server is a centralized storage for sharing data between servers. It can be portioned to limit access to certain device roles depending on security requirements. Within the infrastructure, there is a DNS server that is intended to handle local DNS requests. In general, a RAIN architecture can rely on external DNS within a carrier's IS or IT infrastructures to resolve DNS, but there are situations that require resolution with the local configuration.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   an application server including a processing system having a processor, operating within a television network; and
   a memory that stores executable instructions that, when executed by the processing system, facilitate performance of operations, the operations comprising:
      receiving a client request for a web application via a network from a client device of a client, wherein the client device comprises subscriber equipment of a subscriber to the network;
      retrieving source code from a source code library stored in a database coupled to the network to obtain retrieved source code in accordance with the client request for the web application, wherein the source code comprises a first portion and a second portion, wherein the source code defines a plurality of services, and wherein the retrieved source code comprises code to render a plurality of images;
      executing the first portion of the source code to generate second code for execution by a web server in response to the client request for the web application and to generate Dynamic hypertext markup language (HTML) code, the web server thereby rendering a customized presentation of the web application at equipment of the client, wherein the second portion of the source code comprises client-specific rendering code for rendering the customized presentation at the equipment of the client, wherein the customized presentation comprises the plurality of images, wherein the client-specific rendering code is generated by executing a server-side script included in the retrieved source code; and
      providing the Dynamic HTML code to the subscriber equipment in response to the client request for the web application, wherein the client request for the web application is submitted via a subscriber path of the network comprising the web server and the application server, wherein the subscriber path is symmetrical with a content provider path of the network for transmitting media content, wherein the subscriber path and content provider path are logically separated so that subscriber information and content provider information are shared only via the database, wherein each of the plurality of services of the television network is associated with a source code that defines the plurality of services, and wherein the first portion of the source code comprises a server-side script, a client-side script, media content, and wherein the Dynamic HTML code is generated by the application server by executing the server-side script included in the retrieved source code.

2. The device of claim 1, wherein the processing system comprises a network element of the network, wherein the executing of the first portion to generate the second code for execution by the web server further comprises modifying an existing web application.

3. The device of claim 1, wherein the equipment of the client comprises a set-top box, a computer, or a mobile phone, and wherein all connections on the content provider path are subject to strict enforcement of protocol and access.

4. The device of claim 1, wherein the retrieved source code comprises media content or styling information.

5. The device of claim 1, wherein the server-side script comprises an application framework script, a hypertext preprocessor script, or a Java server pages script.

6. The device of claim 1, wherein the media content comprises audio content, image content, or a combination thereof.

7. The device of claim 1, wherein the network comprises an interactive television system.

8. The device of claim 1, wherein the client-specific rendering code comprises dynamic hypertext markup language code.

9. The device of claim 1, wherein the source code defines the plurality of services supplied by an interactive television system.

10. The device of claim 9, wherein the operations further comprise adding, updating, loading, deploying or modifying an interactive television service by modifying the source code.

11. A method comprising:
receiving, by a processing system comprising an application server of a television network including a processor, a client request for a web application to access media content via a network from a client device of a client, wherein the client device comprises subscriber equipment of a subscriber to the network;
retrieving, by the processing system, source code from a source code library stored in a database coupled to the network to obtain retrieved source code in accordance with the client request for the web application, wherein the retrieved source code comprises a first portion and a second portion, wherein the retrieved source code defines a network service of a plurality of services, and wherein the retrieved source code comprises code to render a plurality of images;
executing, by the processing system, the first portion of the retrieved source code to generate second code for execution by a web server to generate Dynamic hypertext markup language (HTML) code in response to the client request for the web application, the web server thereby rendering a customized presentation of the web application to access the media content at the subscriber equipment of the client, wherein the customized presentation of the web application comprises the plurality of images, wherein the second portion of the retrieved source code comprises client-specific rendering code for rendering the customized presentation at the subscriber equipment of the client, wherein the client-specific rendering code is generated by executing a server-side script included in the first portion of the retrieved source code; and
providing, by the processing system, the Dynamic HTML code to the subscriber equipment in response to the client request for the web application, wherein the client request for the web application is submitted via a subscriber path of the network comprising the web server and the application server, wherein the subscriber path is symmetrical with a content provider path of the network for transmitting the media content, wherein the subscriber path and content provider path are logically separated so that subscriber information and content provider information are shared only via the database,
wherein the plurality of services of the television network are associated with a plurality of source codes that define the plurality of services, the plurality of source codes in the source code library, and wherein the first portion of the retrieved source code comprises a server-side script, a client-side script, media content, and wherein the Dynamic HTML code is generated by the application server by executing the server-side script included in the retrieved source code.

12. The method of claim 11, wherein the processing system comprises a network element of the network.

13. The method of claim 11, wherein the retrieved source code comprises media content or styling information.

14. The method of claim 11, wherein the second portion of the source code comprises dynamic hypertext markup language code.

15. The method of claim 11, wherein the network comprises an interactive television system, and wherein the plurality of source codes in the source code library define the plurality of services supplied by the interactive television system.

16. The method of claim 11, wherein the media content comprises audio content, image content, or a combination thereof.

17. A non-transitory, machine-readable storage medium, comprising executable instructions that, when executed by an application server of a television network, the application server including a processing system having a processor operating within the application server of the television network, facilitate performance of operations, comprising:
receiving a client request for a web application to access media content from a client device of a client via a network coupled to the processing system, wherein the client device comprises subscriber equipment of a subscriber to the network;
retrieving source code from a source code library stored in a database coupled to the network to obtain retrieved source code in accordance with the client request for the web application, wherein the retrieved source code comprises a first portion and a second portion, wherein the retrieved source code defines a network service of a plurality of services, and wherein the retrieved source code comprises code to render a plurality of images;
executing the first portion of the retrieved source code to generate second code for execution by a web server and to generate Dynamic hypertext markup language (HTML) code in response to the client request for the web application, the web server thereby rendering a customized presentation of the web application to access the media content at the subscriber equipment of the client, wherein the customized presentation comprises the plurality of images, wherein the second portion of the retrieved source code comprises client-specific rendering code for rendering the customized presentation of the web application at the subscriber equipment of the client, wherein the client-specific rendering code is generated by executing a server-side script included in the first portion of the retrieved source code; and providing the Dynamic HTML code to the subscriber equipment in response to the client request for the web application, wherein the client request for the web application is submitted via a subscriber path of the network comprising the web server and the application server, wherein the subscriber path is symmetrical with a content provider path of the network for transmitting the media content, wherein the subscriber path and content provider path are logically separated so that subscriber information and content provider information are shared only via the database, wherein the plurality of services of the television network are associated with a plurality of source code that define the plurality of services, the plurality of source codes in the source code library, and wherein the first portion of the retrieved source code comprises a server-side script, a client-side script, media content, and wherein the Dynamic HTML code is generated by the application server by executing the server-side script included in the retrieved source code.

18. The non-transitory, machine-readable storage medium of claim 17, wherein the application server and the web server communicate via the network.

19. The non-transitory, machine-readable storage medium of claim 17, wherein the client-specific rendering code comprises dynamic hypertext markup language code.

20. The non-transitory, machine-readable storage medium of claim 17, wherein the retrieved source code comprises media content or styling information.

* * * * *